(12) United States Patent
Shiotsuki et al.

(10) Patent No.: US 10,919,430 B2
(45) Date of Patent: Feb. 16, 2021

(54) PRODUCTION FACILITY FOR PIPE COMPONENTS

(71) Applicant: DAIKIN INDUSTRIES, LTD., Osaka (JP)

(72) Inventors: Satoshi Shiotsuki, Osaka (JP); Yukio Shigenaga, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 161 days.

(21) Appl. No.: 16/081,698

(22) PCT Filed: Apr. 14, 2017

(86) PCT No.: PCT/JP2017/015334
§ 371 (c)(1),
(2) Date: Aug. 31, 2018

(87) PCT Pub. No.: WO2017/179715
PCT Pub. Date: Oct. 19, 2017

(65) Prior Publication Data
US 2019/0061596 A1    Feb. 28, 2019

(30) Foreign Application Priority Data

Apr. 15, 2016    (JP) .................................. 2016-081861

(51) Int. Cl.
*B60P 3/14*    (2006.01)
*B23K 37/02*    (2006.01)
(Continued)

(52) U.S. Cl.
CPC .................. *B60P 3/14* (2013.01); *B21D 7/06* (2013.01); *B23K 1/0008* (2013.01);
(Continued)

(58) Field of Classification Search
CPC ....... B23K 1/00; B23K 37/0294; B23P 19/00; B60P 3/00; B60P 3/14
(Continued)

(56) References Cited

U.S. PATENT DOCUMENTS 3,633,970 A * 1/1972 Langhals .................. B60P 3/14
296/24.32
9,469,236 B2 * 10/2016 Nicholson ............. B23P 21/004
(Continued)

FOREIGN PATENT DOCUMENTS

CN    104822995 A    8/2015
JP    59-107834 A    6/1984
(Continued)

OTHER PUBLICATIONS

International Search Report for PCT/JP2017/015334 dated Jul. 4, 2017.

*Primary Examiner* — Jason S Daniels
(74) *Attorney, Agent, or Firm* — Birch, Stewart, Kolasch & Birch, LLP

(57) ABSTRACT

One box body is attached to an undercarriage of a trailer, and provided with a brazing area, a gastight testing area, and a finishing area aligned with one another in this order along a first side wall of the box body the brazing area, a plurality of members are bonded together by brazing to produce a half-finished product. In the gastight testing area, gastightness of the half-finished product is tested. In the finishing area, the half-finished product is covered with a thermal insulator to completely produce a pipe component. As a result, it becomes possible to properly dispose a working area, where the pipe component is produced, in the interior space of one box body without losing workability.

9 Claims, 13 Drawing Sheets

(51) Int. Cl.
 *F16L 13/08* (2006.01)
 *B21D 7/06* (2006.01)
 *B23K 1/00* (2006.01)
 *F24F 1/32* (2011.01)
 *B23K 101/06* (2006.01)

(52) U.S. Cl.
 CPC .......... *B23K 37/0294* (2013.01); *F16L 13/08* (2013.01); *B23K 2101/06* (2018.08); *F24F 1/32* (2013.01)

(58) Field of Classification Search
 USPC ....................................................... 296/24.32
 See application file for complete search history.

(56) References Cited

U.S. PATENT DOCUMENTS

| | | | |
|---|---|---|---|
| 2008/0175699 A1* | 7/2008 | Singleton | B60P 3/14 414/458 |
| 2015/0345845 A1 | 12/2015 | Nakatsu | |
| 2017/0088032 A1* | 3/2017 | Nielsen | B60J 7/026 |

FOREIGN PATENT DOCUMENTS

| | | |
|---|---|---|
| JP | 3-180234 A | 8/1991 |
| WO | WO 2014/087659 A1 | 6/2014 |

* cited by examiner

PRODUCTION FACILITY FOR PIPE COMPONENTS

TECHNICAL FIELD

The present disclosure relates to a production facility producing a pipe component for use in installation of a refrigeration apparatus.

BACKGROUND ART

Patent Document 1 discloses a method of producing a pipe component for use in installation of a refrigeration apparatus. The method disclosed in Patent Document 1 includes a step of producing a half-finished product by bonding a plurality of members together by brazing, a step of performing a gastight test of the half-finished product, and a step of covering the half-finished product that is revealed to be gastight with a heat insulator.

Patent Document 2 discloses a movable production facility for producing a pipe component for use in, e.g., a power plant. In this production facility, devices necessary for producing the pipe components (e.g., a cutter for cutting pipes, and a device for welding the pipes) are mounted in a plurality of trailers. The trailers mounting these devices are delivered to a worksite such as a power plant, and the pipe component is produced at the site.

CITATION LIST

Patent Documents

[Patent Document 1] WO2014/087659
[Patent Document 2] Japanese Unexamined Patent Publication No. S59-107834

SUMMARY OF THE INVENTION

Technical Problem

It is conceivable that the facility for fabricating pipe components disclosed in Patent Document 1 may be delivered to a site where a refrigeration apparatus is installed to produce the pipe components at the site. At that time, it is also conceivable to form, in an interior space of a box body attached to a vehicle such as a trailer, a working area for brazing, performing a gastight test, and covering with a thermal insulator. However, how these areas are disposed in a relatively narrow interior space of the box body without losing workability has not been considered.

The present disclosure is conceived in view of the above problems, and attempts to provide a technique of properly disposing a working area where a pipe component is produced in an interior space of one box body without losing workability.

Solution to the Problem

A first aspect of the present disclosure is directed to a production facility producing a pipe component for use in installation of a refrigeration apparatus. The production facility includes: one box body (20) disposed on an undercarriage (202) of a vehicle (201, 205) to allow an interior space of the box body (20) to serve as a working space; a brazing area (30) formed in the interior space of the box body (20), and provided with at least a brazing table (31) where a plurality of members are bonded together by brazing to produce a half-finished product (101); a gastight testing area (40) formed in the interior space of the box body (20), and provided with at least a gastight testing table (41) where gas-tightness of the half-finished product (101) is tested; and a finishing area (50) formed in the interior space of the box body (20), and provided with at least a finishing table (51) where the half-finished product (101) is covered with a thermal insulator (104) to completely produce the pipe component (100), wherein in the interior space of the box body (20), the brazing area (30), the gastight testing area (40), and the finishing area (50) are aligned with one another along a first side wall (21) of the box body (20) disposed along a longitudinal direction of the box body (20).

In the first aspect, the interior space of the box body (20) is provided with a brazing area (30), a gastight testing area (40), and a finishing area (50). The box body (20) is provided to the undercarriage (202) of the vehicle (201, 205) and is movable. The brazing area (30) is provided with the brazing table (31). The gastight testing area (40) is provided with the gastight testing table (41). The finishing area (50) is provided with the finishing table (51). In the interior space of the box body (20), the brazing area (30), the gastight testing area (40), and the finishing area (50) are aligned with one another along one of the side walls of the box body (20), i.e., the first side wall (21) of the box body (20). Thus, in the interior of the box body (20), a passage where the worker produces the pipe component (100) is provided along the other side wall of the box body (20).

A second aspect of the present disclosure is an embodiment of the first aspect of the present disclosure. In the second aspect, the box body (20) has a rear end provided with a door (24), and the brazing area (30), the gastight testing area (40), and the finishing area (50) are aligned with one another in this order from the rear end of the box body (20) toward a front end of the box body (20).

According to the second aspect, the brazing area (30) for brazing is disposed at the position closer to the rear end of the box body (20). A burner is used in the brazing to melt a brazing material. Therefore, the brazing area (30) has to be ventilated sufficiently. The box body (20) has a rear end provided with the door (24). When this door (24) is opened, the rear end is opened. Here, in this aspect, the brazing area (30) is disposed closer to the rear end of the box body (20) into which fresh air is likely to enter from the outside of the box body (20).

A third aspect of the present disclosure is an embodiment of the second aspect of the present disclosure. In the third aspect, the box body (20) has a delivery port (60) in the first side wall (21) at a position along the finishing area (50), the delivery port (60) delivering the pipe component (100) out of the box body (20).

According to the third aspect, the delivery port (60) is formed in the first side wall (21) of the box body (20) at a position facing the finishing area (50). The half-finished product (101) that has been produced in the brazing area (30) disposed at the position closer to the rear end of the box body (20) is carried from the rear end of the box body (20) toward the front end thereof. Then, the half-finished product (101) is formed to be a complete product, i.e., the pipe component (100) in the finishing area (50) disposed at the position closer to the rear end of the box body (20). The pipe component (100) that has been finished in the finishing area (50) is carried from the delivery port (60) to the outside of the box body (20).

A fourth aspect of the present disclosure is an embodiment of the third aspect of the present disclosure. In the fourth aspect, the delivery port (60) is a laterally elongated opening extending along an upper surface of the finishing table (51).

In the fourth aspect, the delivery port (60) is formed along the upper surface of the finishing table (51). Therefore, the worker, by pushing the pipe component (100) produced on the finishing table (51) toward a further side from the worker, can feed the pipe component (100) from the delivery port (60) toward the outside of the box body (20).

A fifth aspect of the present disclosure is an embodiment of the third or fourth aspect of the present disclosure. In the fifth aspect, the production facility further includes a sheet member (62) stretching from the delivery port (60) to an outside of the box body (20), and receiving the pipe component (100) fed from the delivery port (60). a sheet member (62) stretching from the delivery port (60) to an outside of the box body (20), and receiving the pipe component (100) fed from the delivery port (60).

According to the fifth aspect, the sheet member (62) stretches from the delivery port (60) to the outside of the box body (20). The pipe component (100) fed from the delivery port (60) is received by the sheet member (62), and slides down on the sheet member (62).

A sixth aspect of the present disclosure is an embodiment of the first aspect of the present disclosure. In the sixth aspect, the production facility further includes a pipe bender (71) disposed adjacent to the brazing area (30) in a width direction of the box body (20), and bending a pipe constituting the half-finished product (101).

According to the sixth aspect, the pipe bender (71) is disposed adjacent to the brazing area (30) in the width direction of the box body (20). The worker can bend the pipes using the pipe bender (71) and bond members, such as the pipes bend with the pipe bender (71), together by brazing without moving along the longitudinal direction of the box body (20).

A seventh aspect of the present disclosure is an embodiment of the first aspect of the present disclosure. In the seventh aspect, the gastight testing table (41) is provided with: a cover member (45) housing the half-finished product (101) by covering the half-finished product (101) that is a target for the gastight test; and an air supply fan (49) supplying the testing space (47) with air outside the box body (20).

According to the seventh aspect, the gas-tightness of the half-finished product (101) is tested in the testing space (47) surrounded by the cover member (45). The air supply fan (49) supplies the testing space (47) with air outside the box body (20). Thus, even if testing gas for use in the gastight test leaks into the testing space (47), the testing gas is immediately discharged from the testing space (47), and the atmosphere in the testing space (47) is maintained to be substantially the same as that in the outside.

An eighth aspect of the present disclosure is an embodiment of the first aspect of the present disclosure. In the eighth aspect, the box body (20) has an openable/closable second side wall (22) facing the first side wall (21).

In the box body (20) in the eighth aspect, the second side wall (22) located further from the brazing area (30), the gastight testing area (40), and the finishing area (50) is openable/closable. That is to say, in the box body (20) in this aspect, the second side wall (22) adjacent to the passage where the worker stays can be opened. When the second side wall (22) is opened, the half-finished product (101) or the body of the worker does not abut on the second side wall (22) during the production of the pipe component (100) in the passage.

A ninth aspect of the present disclosure is an embodiment of the eighth aspect of the present disclosure. In the ninth aspect, the box body (20) is in a shape of a plate extending in the longitudinal direction of the box body (20), and has a passage formation member (91) outwardly extending from a side of a bottom of the box body (20) with the second side wall (22) being opened.

According to the ninth aspect, the box body (20) is provided with the passage formation member (91). The passage formation member (91) is a plate-shaped member extending in the longitudinal direction of the box body (20). The passage formation member (91) is disposed so as to extend outwardly from the bottom of the box body (20) with the second side wall (22) being opened. This passage formation member (91), along with the portion of the interior space of the box body (20) along the second side wall (22), forms the passage where the worker moves or performs the operation.

Advantages of the Invention

According to the first aspect, in the interior space of the box body (20), the brazing area (30), the gastight testing area (40), and the finishing area (50) are aligned with one another along the first side wall (21) of the box body (20). As a result, the passage for the worker is formed along the side wall, opposite to the first side wall (21), of the box body (20). In the interior space of the box body (20), the worker producing the pipe component (100) can move among the plurality of areas (30, 40, 50) by passing through the straight passage along the side wall of the box body (20). This simplifies the lines of the operational flow of the worker in the interior space of the box body (20). Thus, this aspect allows for disposing the brazing area (30), the gastight testing area (40), and the finishing area (50) in the interior space of one box body (20) without losing workability.

According to the second aspect, the brazing area (30) for brazing is disposed at the position closer to the rear end of the box body (20). Therefore, the brazing area (30) can be ventilated sufficiently, reliably keeping the oxygen content in the brazing area (30) from decreasing too much.

According to the third aspect, the delivery port (60) is formed in the first side wall (21) of the box body (20). The pipe component (100) that has been finished in the finishing area (50) is carried from the delivery port (60) to the outside of the box body (20). The pipe component (100) that has been finished in the finishing area (50) that is furthest from the rear end of the box body (20) can directly be carried from the delivery port (60) toward the outside of the box body (20) without carrying the product from the front end of the box body (20) to the rear end thereof. Thus, this aspect allows for further simplifying the line of the operational flow of the workers in the interior space of the box body (20), improving operational efficiency of the production operation of the pipe component (100).

In the fourth aspect, the delivery port (60) is formed along the upper surface of the finishing table (51). Therefore, the worker, by only pushing the pipe component (100) on the finishing table (51) toward a further side from the worker, can feed the pipe component (100) from the delivery port (60) toward the outside of the box body (20). Accordingly, the aspect allows for easily carrying the pipe component (100) out.

In the fifth aspect, the pipe component (100) fed from the delivery port (60) is received by the sheet member (62). Therefore, this can prevent the pipe component (100) fed from the delivery port (60) from being broken.

According to the sixth aspect, the pipe bender (71) is disposed adjacent to the brazing area (30) in the width direction of the box body (20). This can minimize the moving distance of the first worker bending the pipe and performing brazing.

According to the seventh aspect, the atmosphere in the testing space (47) for performing the gastight test can be maintained to be substantially the same as that in the outside air. Therefore, if the testing gas for the gastight test leaks from the target half-finished product (101), the leaked gas can reliably be detected to reliably detect the half-finished product (101) that is not gastight (i.e., a defective product).

According to the eighth aspect, the second side wall (22) is openable/closeable. When the second side wall (22) is opened, the half-finished product (101) or the body of the worker does not abut on the second side wall (22) during the operation in the box body (20). Therefore, according to this aspect, the pipe component (100) can be produced smoothly in the box body (20), improving the production efficiency of the pipe component (100).

According to the ninth aspect, the passage formation member (91) provided to the box body (20), along with the portion of the interior space of the box body (20) along the second side wall (22), forms the passage where the worker moves or performs the operation. Therefore, according to this aspect, the passage where the worker moves and performs the operation can be expanded in the width direction of the box body (20) (a direction orthogonal to the longitudinal direction), further smoothly performing the production of the pipe component (100).

DESCRIPTION OF EMBODIMENTS

Embodiments of the present disclosure will be described in detail with reference to the drawings. Note that the following embodiments and variations are essentially beneficial examples in nature, and are not intended to limit the scope, applications, or use of the invention.

First Embodiment

A first embodiment will be described. A production facility (10) according to this embodiment is a facility producing a pipe component (100) for use in installation of an air conditioner which is a kind of a refrigeration apparatus. The pipe component (100) produced in this production facility (10) is used for, in a situation where an air conditioner is installed in, e.g., relatively large buildings and commercial facilities, connecting together an outdoor unit and an indoor unit which constitute the air conditioner.

Figure 1:
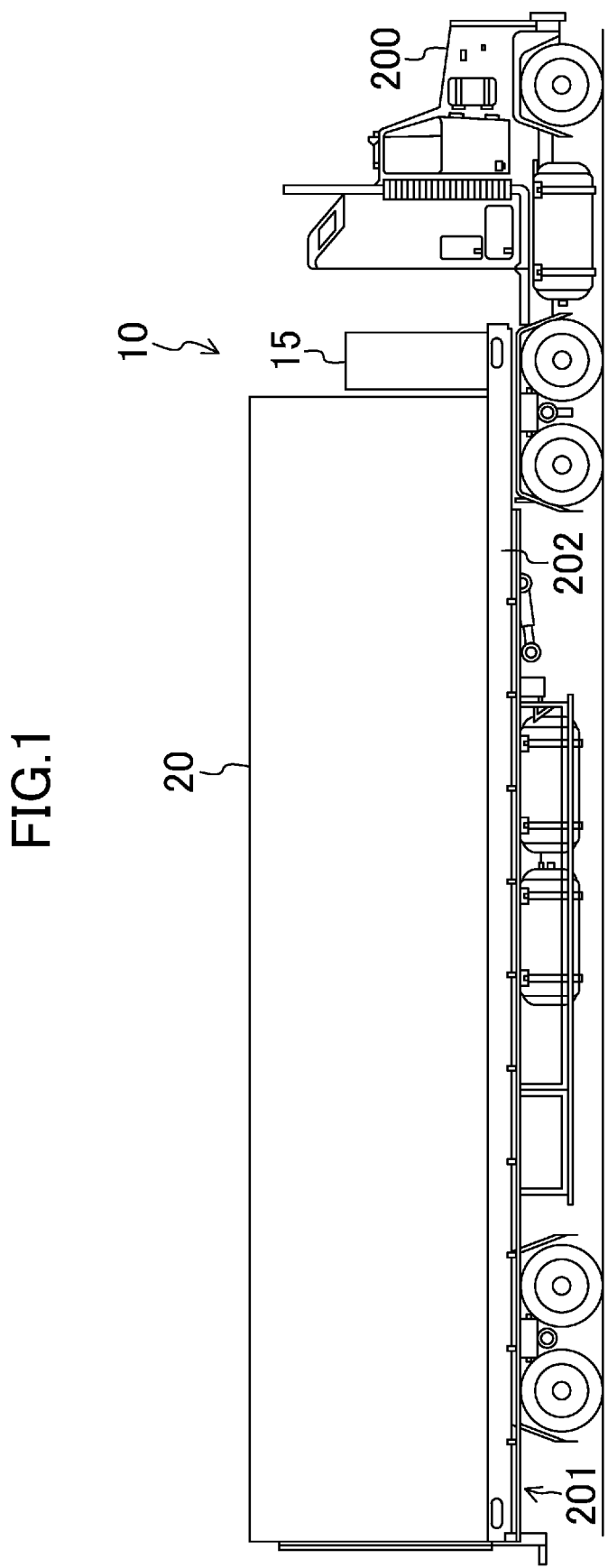
FIG. 1 is a side view of a trailer mounting a production facility of a first embodiment, and a tractor coupled to the trailer.

As shown in FIG. 1, the production facility (10) in the embodiment includes a box body (20), a power generator (15), and an air conditioner conditioning air in an interior space of a box body (20). The air conditioner included in the production facility (10) will be omitted.

The production facility (10) in the embodiment is mounted onto an undercarriage (202) of a trailer (201) pulled by a tractor (200). In the undercarriage (202) of the trailer (201), the power generator (15) is disposed in front of the box body (20). An outdoor unit of the air conditioner conditioning air in the interior space of the box body (20) is disposed in front of the box body (20) in the undercarriage (202) of the trailer (201).

—Configuration of Box Body—

The box body (20) is in the shape of an elongated rectangular box. An example of the box body (20) includes a container for use in, e.g., marine transportation. The rear end of the box body (20) is a rear-end opening (23) fully opened. The box body (20) is provided with a pair of, double rear doors (24) to close the rear-end opening (23). In other words, the rear end of the box body (20) is provided with the rear doors (24). The box body (20) has, when viewed from its rear end, a left side plate that is a first side wall (21) and a left side plate that is a second side wall (22). A side plate of the box body (20) at its front end constitutes a front end wall (25).

Figure 2:
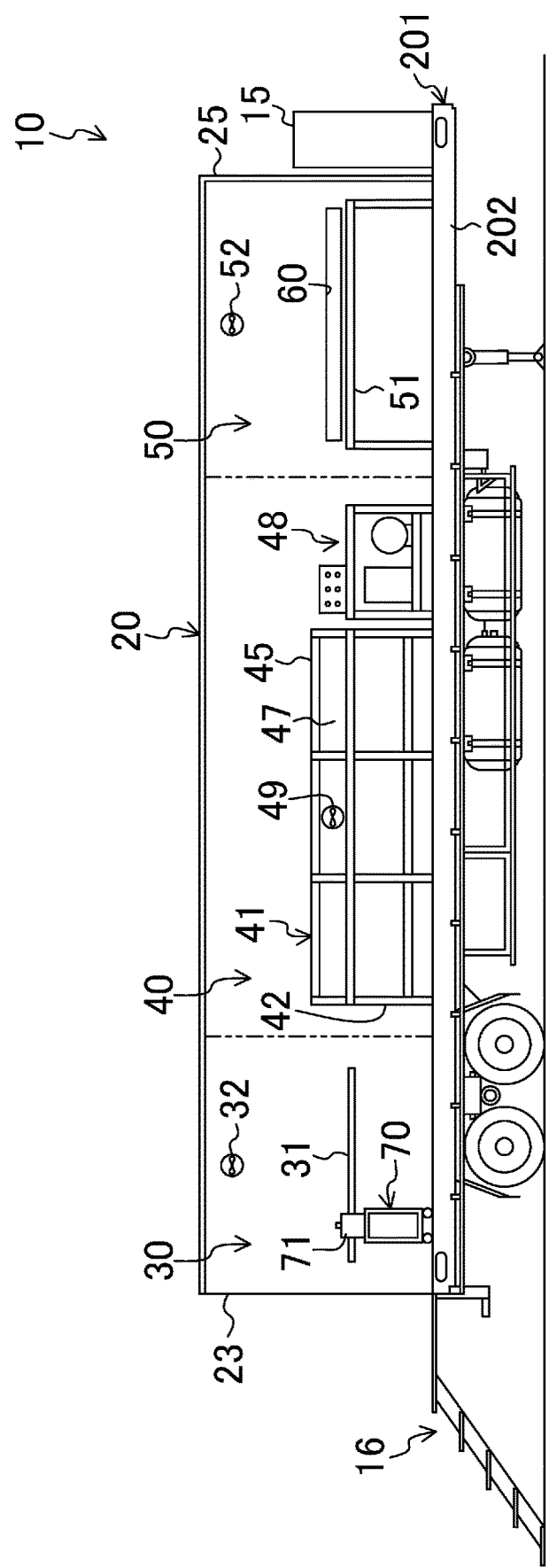
FIG. 2 is a side view of the trailer mounting the production facility of the first embodiment, with a side wall of the box body being omitted.

The rear end of the box body (20) is provided with foldable steps (16). When the pipe component (100) is produced in the production facility (10) of the embodiment, as shown in FIG. 2, the steps (16) are disposed so as to extend rearward from the rear end of the box body (20). A worker enters, and exits from the box body (20) using the steps (16).

—Interior Configuration of Box Body—

Figure 3:
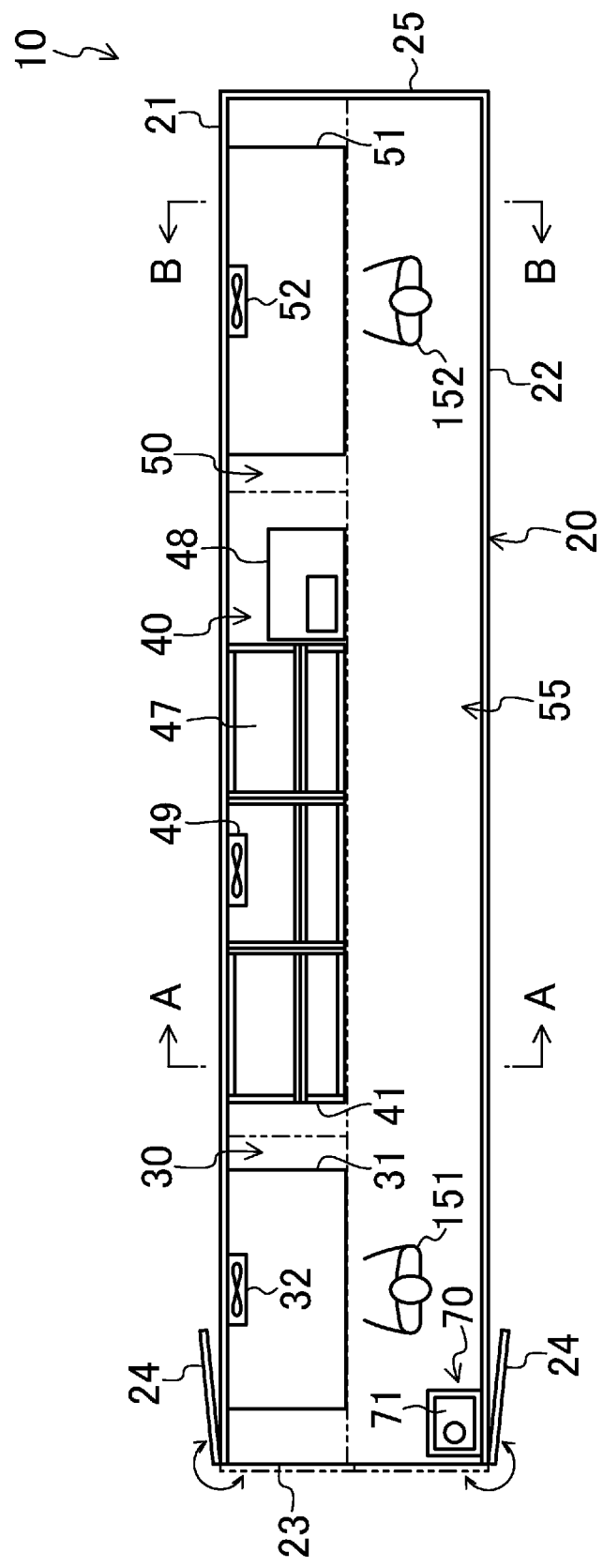
FIG. 3 is a plan view of the production facility of the first embodiment, with a brazing table being available and a ceiling of the box body being omitted.

As shown in FIGS. 2 and 3, the interior space of the box body (20) is provided with a brazing area (30), a gastight testing area (40), a finishing area (50), and a working passage (55). The working passage (55) is provided with a bender unit (70) which will be described later.

In the interior space of the box body (20), the brazing area (30), the gastight testing area (40), and the finishing area

(50) are aligned with one another in this order from the rear end of the box body (20) toward the front end thereof along the first side wall (21) of the box body (20). In the interior space of the box body (20), the rest region of the box body (20) along the second side wall (22) is the working passage (55).

That is to say, the interior space of the box body (20) is divided into the brazing area (30), the gastight testing area (40), and the finishing area (50) which are closer to the first side wall (21) of the box body (20) in the width direction of the box body (20) than the central portion of the box body (20) is. Also, in the interior space of the box body (20), an area closer to the second side wall (22) of the box body (20) in the width direction of the box body (20) than the central portion of the box body (20) is constitutes the working passage (55) extending from the rear end of the box body (20) to the front end thereof.

<Brazing Area>

As shown in FIGS. 2 and 3, the brazing area (30) is adjacent to the rear-end opening (23) of the box body (20). In the brazing area (30), a brazing table (31) is disposed. On the brazing table (31), a plurality of members are bonded together by brazing to produce a half-finished product (101). The brazing area (30) is also provided with, e.g., a burner, a fuel gas cylinder which are necessary for brazing, too, which are not shown.

Figure 4:
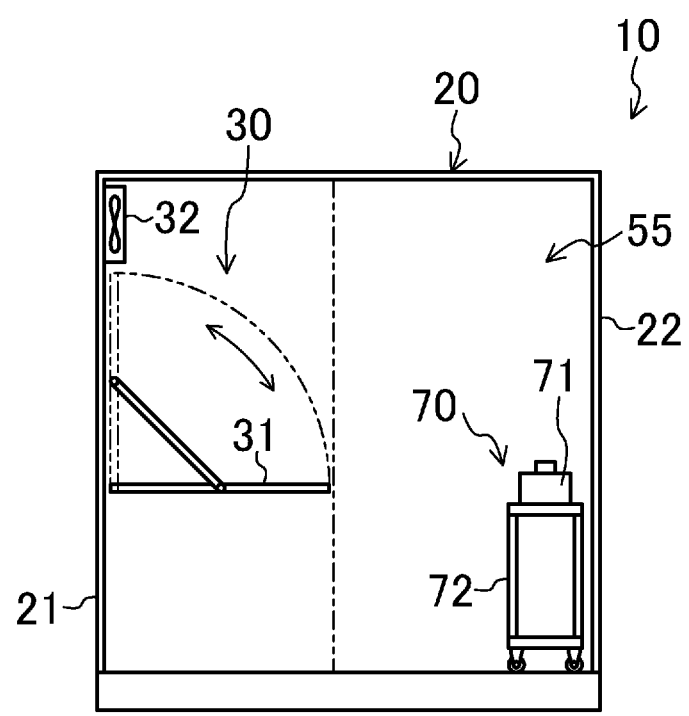
FIG. 4 is a rear view of a production device of the first embodiment.

The brazing table (31) is in the shape of a rectangular plate. As shown in FIG. 4, the brazing table (31) has one long side fixed to the first side wall (21) of the box body (20), allowing the brazing table (31) to turn on the first side wall (21). The brazing table (31) is movable between an available state (substantially horizontal) indicated by the solid line in FIGS. 3 and 4, and a stored state (substantially perpendicular disposed along the first side wall (21)) indicated by the dash-dot-dot line in FIG. 4.

In the first side wall (21) of the box body (20) at a position facing the brazing area (30), an air supply fan (32) is disposed to supply the brazing area (30) and the working passage (55) with outside air (in other words, air outside the box body (20)).

A burner is used in brazing performed in the brazing area (30) to melt a brazing material. When the burner burns fuel gas, oxygen is consumed. Therefore, insufficient ventilation in the brazing area (30) may decrease the oxygen content in the brazing area (30). Also, if the fuel gas leaks, the leaked fuel gas may catch fire. In the production facility (10) of the embodiment, the brazing area (30) is disposed adjacent to the rear-end opening (23) of the box body (20) so as to be sufficiently ventilated.

<Bender Unit>

As shown in FIGS. 2 and 3, the bender unit (70) is disposed in a region of the working passage (55) at a position adjacent to the brazing area (30). The bender unit (70) includes a pipe bender (71) bending a cupper pipe constituting the half-finished product (101), and a table (72) on which the pipe bender (71) is put. A caster is attached to this table (72). Thus, the bender unit (70) is movable.

<Airtight Testing Area>

As shown in FIGS. 2 and 3, the gastight testing area (40) is adjacent to the brazing area (30). This gastight testing area (40) is located in the central portion of the box body (20) in the longitudinal direction of the box body (20). The gastight testing area (40) is provided with a gastight testing table (41) for putting thereon a half-finished product (101) that is a target for the gastight test, and auxiliaries (48) for performing the gastight test.

Figure 6:
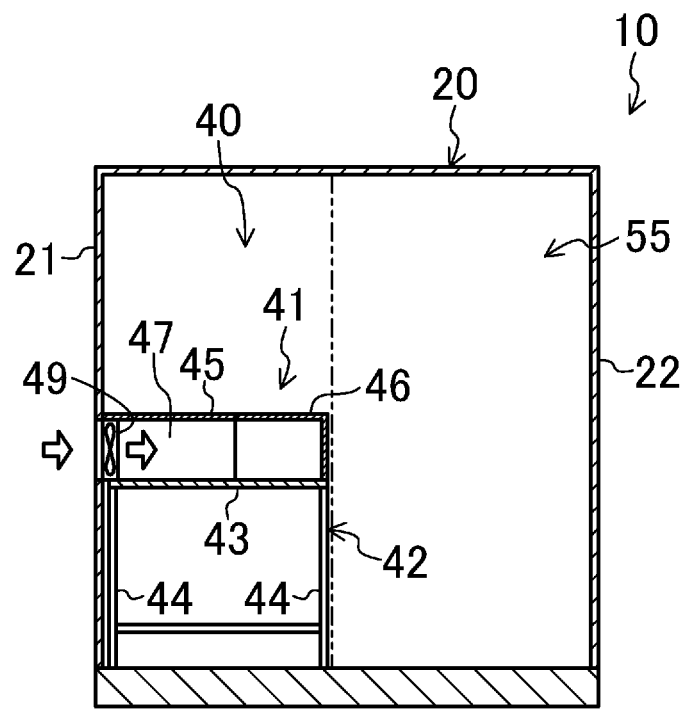
FIG. 6 is a cross sectional view of the production facility of the first embodiment taken along line A-A in FIG. 3, with a cover door being closed.

As shown in FIG. 6, a gastight testing table (41) includes a table-shape, testing table body (42) and a cover member (45). The testing table body (42) has a rectangular-shaped top plate (43), and legs (44) supporting the top plate (43). The cover member (45) is in the shape of box having an opened lower surface, and is disposed so as to cover the top plate (43) of the testing table body (42). In the gastight testing table (41), a space is surrounded by the top plate (43) of the testing table body (42) and the cover member (45) to form a testing space (47).

Figure 7:
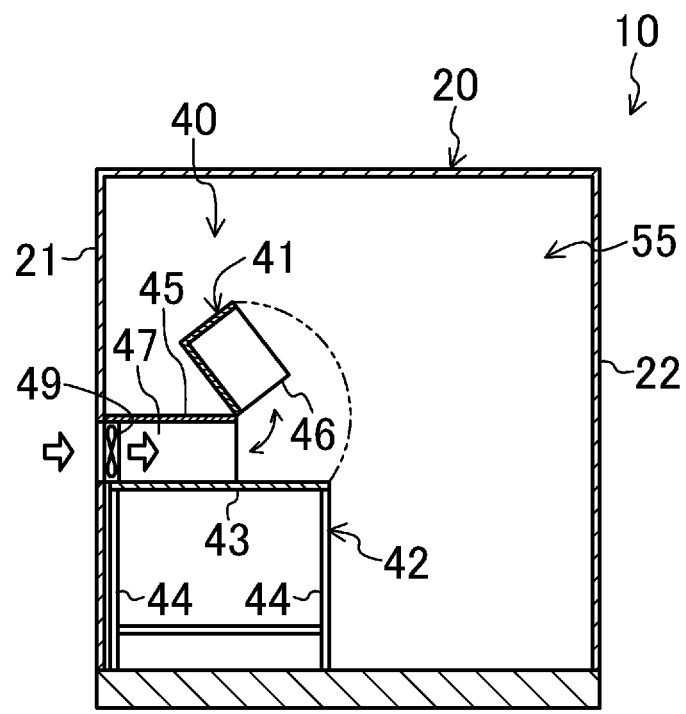
FIG. 7 is a cross sectional view of the production facility of the first embodiment taken along line A-A in FIG. 3, with a cover door being opened.

The top and front surfaces of the cover member (45) are comprised of a transparent polycarbonate plate. The side and rear surfaces of the cover member (45) are configured as a punched plate including a number of small holes. As shown in FIG. 7, the cover member (45) has a portion closer to its front surface and constituting a cover door (46) turnable on the rest.

The auxiliaries (48) are disposed on a lateral side of the gastight testing table (41). The auxiliaries (48) are configured as a cylinder of testing gas with which the half-finished product (101) is filled to perform the gastight test, and a pressure indicator measuring a pressure of the testing gas with which the half-finished product (101) is filled. In this embodiment, as an example of the testing gas, a mixed gas of a so-called fluorocarbon gas and nitrogen is used. However, the gas, together with nitrogen, constituting the testing gas is not limited to fluorocarbon gas.

In the first side wall (21) of the box body (20) at a position facing the gastight testing area (40), an air supply fan (49) is disposed to supply the gastight testing area (40) with outside air (in other words, air outside the box body (20)). As shown in FIG. 6, this air supply fan (49) is disposed directly on the top plate (43) of the testing table body (42) to blow outdoor air into the testing space (47) of the gastight testing table (41). The outdoor air supplied to the testing space (47) by the air supply fan (49) passes through, e.g., small holes of the punched plate constituting the side and rear surfaces of the cover member (45) and a gap between the testing table body (42) and the cover member (45) to flow out of the testing space (47).

<Finishing Area>

As shown in FIGS. 2 and 3, the finishing area (50) is disposed closer to the front end wall (25) of the box body (20). The finishing area (50) is provided with a finishing table (51). The finishing table (51) is in the shape of a rectangular table, and has a long side along the first side wall (21) of the box body (20). On the finishing table (51), the half-finished product (101) is covered with a thermal insulator (104) to completely produce the pipe component (100). In the finishing area (50), e.g., the thermal insulator (104) and an adhesive tape fixing the thermal insulator (104) are also disposed, though not shown.

Figure 8:
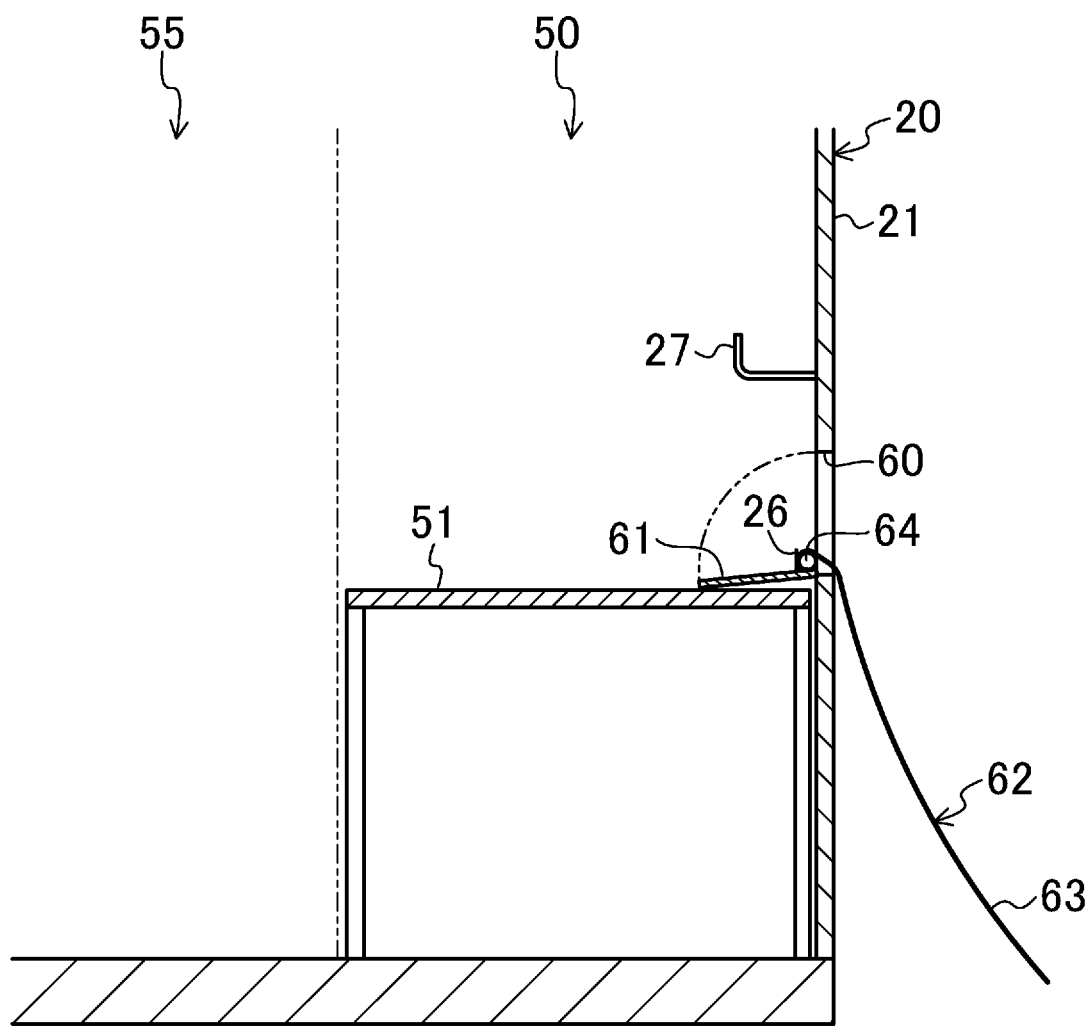
FIG. 8 is a main part of a cross sectional view of the production facility of the first embodiment taken along line B-B in FIG. 3.

As shown in FIGS. 2 and 8, in the first side wall (21) of the box body (20) at a position facing the finishing area (50), a delivery port (60) is formed to deliver the pipe component (100) to the outside of the box body (20). This delivery port (60) is an elongated rectangular opening extending along the upper surface of the finishing table (51). The first side wall (21) of the box body (20) is provided with a delivery door (61) closing the delivery port (60). The delivery door (61) is a member in the shape of a rectangular plate and has a size larger than the delivery port (60). The delivery door (61) is turnable with its long side.

In the first side wall (21) of the box body (20) at a position facing the finishing area (50), an air supply fan (52) is disposed to supply the finishing area (50) and the working passage (55) with outside air.

—Sheet Member, Holding Hook, Storage Hook—

Figure 9:
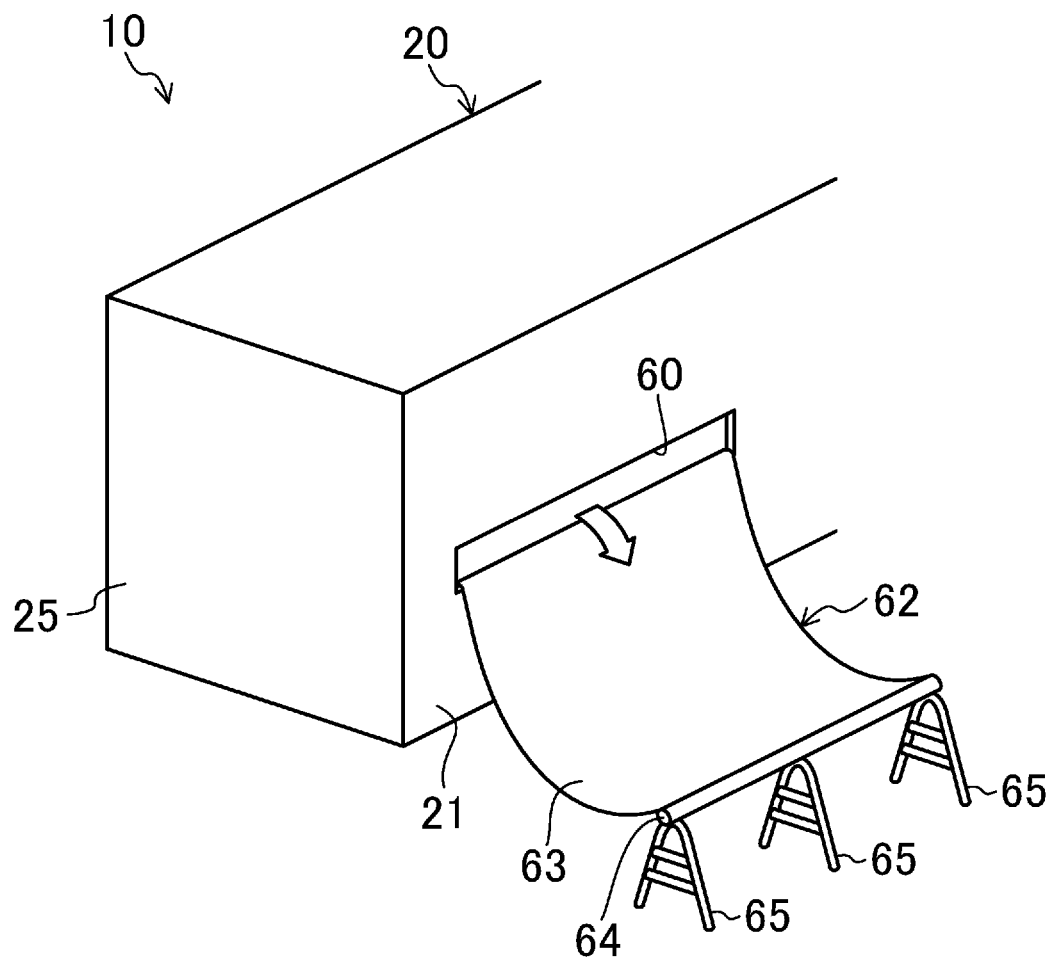
FIG. 9 is a schematic perspective view of the production device of the first embodiment, and showing the box body viewed from front and diagonally above.
Figure 10:
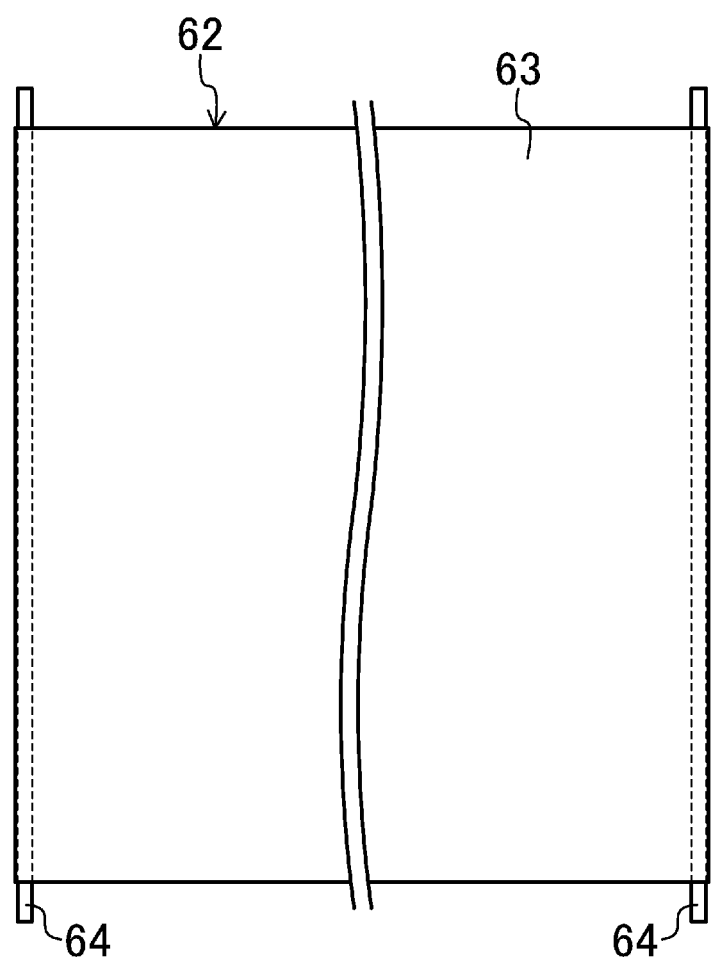
FIG. 10 is a plan view of a sheet member.

As shown in FIGS. 9 and 10, the production facility (10) of this embodiment further includes a sheet member (62) attached to the box body (20). The sheet member (62) includes a body sheet (63) in the shape of a soft rectangular sheet, and a support pipe (64) attached to each of short sides of the body sheet (63). The support pipe (64) has a length longer than the short side of the sheet body (63). Both ends of the support pipe (64) protrude from the edge of the sheet body (63).

As shown in FIG. 8, a pair of holding hooks (26) is attached to the first side wall (21) of the box body (20) to hold the support pipes (64) of the sheet member (62). This holding hook (26) is disposed at both sides of the delivery port (60). A pair of storage hooks (27) is attached to the first side wall (21) of the box body (20) to store the sheet member (62). The storage hooks (27) are disposed above the delivery port (60), and are spaced apart from each other by a predetermined distance.

As shown in FIG. 9, the sheet member (62) stretches from the delivery port (60) of the box body (20) to the pipe stand (65) put on the land outside the box body (20). Both ends of one support pipe (64) of the sheet member (62) are hooked onto the holding hook (26). The other support pipe (64) of the sheet member (62) is fixed to the pipe stands (65). The sheet member (62) is disposed such that a part of the body sheet (63) hangs down below the support pipe (64) fixed to the pipe stands (65) to receive the pipe component (100) fed by the delivery port (60).

The sheet member (62) is retracted inside the box body (20) when the pipe component (100) is not being produced (e.g., in a holiday of workers and during travel of the trailer (201)). At that time, the sheet member (62) is retracted with the body sheet (63) being wound around one support pipe (64), and the end of this support pipe (64) winding the body sheet (63) therearound being hooked onto the storage hook (27).

—Production of Pipe Component—

Figure 5:
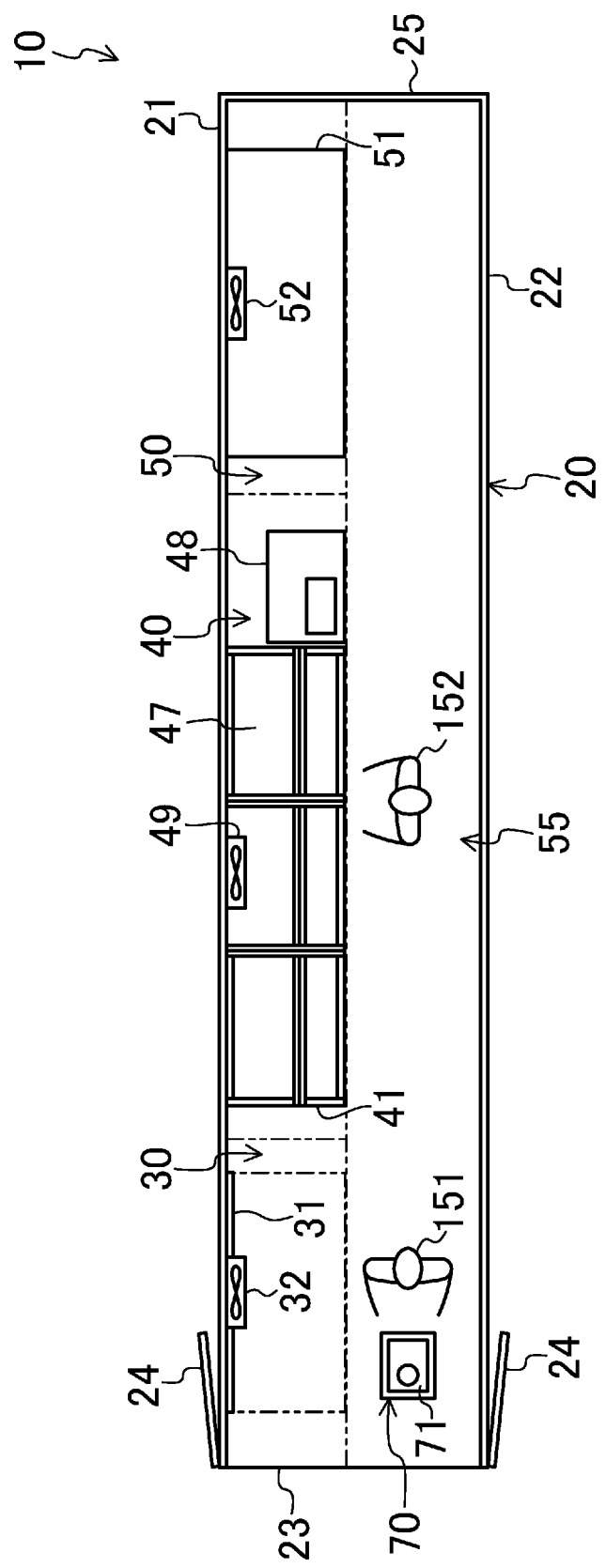
FIG. 5 is a plan view of the production facility of the first embodiment, with the brazing table being stored, and the ceiling of the box body being omitted.

It will now be described how the pipe component (100) is produced in the production facility (10). Here, a case where two workers (151, 152) jointly produce the pipe component (100) will be described. As shown in FIGS. 3 and 5, during the production of the pipe component (100), the rear doors (24) of the box body (20) are kept open.

The first worker (151) performs a preparation step, first. This preparation step is performed in mainly an area of the working passage (55) adjacent to the brazing area (30). When the preparation step is performed, the first worker (151) disposes the brazing table (31) in the folded state (indicated by the dash-dot-dot line in FIG. 4), and the bender unit (70) around the center of the working passage (55) in a width direction of box body (20) (see FIG. 5).

The preparation step is a step of producing pipe members (102) constituting the half-finished product (101). In the preparation step, the first worker (151) cuts a copper pipe into parts with predetermined lengths, and bents the cut copper pipes if necessary. At that time, the first worker (151) bents the copper pipes using the pipe bender (71) of the bender unit (70).

After some pipe members (102) constituting the half-finished product (101) are produced, the first worker (151) finishes the preparation step and starts the brazing step. In performing the brazing step, the first worker (151) makes the brazing table (31) in the available state (indicated by the solid line in FIG. 4), and disposes the bender unit (70) at a position closer to the second side wall (22) (see FIG. 3).

Figure 11:
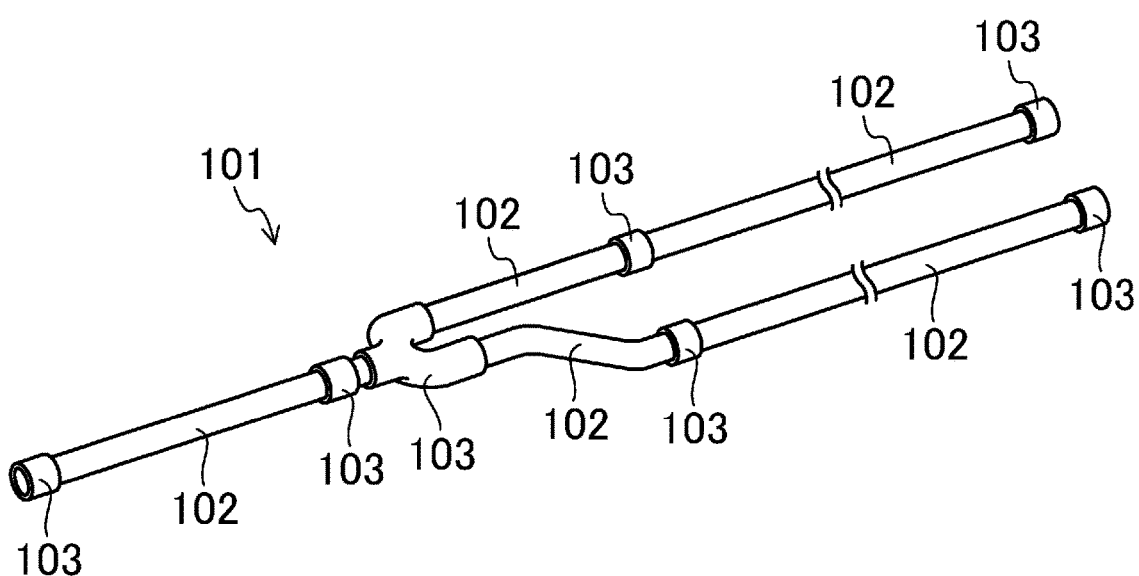
FIG. 11 is a perspective view of an example of a half-finished product produced by the production device.

In the brazing step, the first worker (151) combines the pipe member (102) produced in the preparation step with a joint (103) prepared in advance to bond them together by brazing. As a result, production of the half-finished product (101) is completed by bonding, and integrally forming, a plurality of members together is completed. The first worker (151) performs this step on the brazing table (31). One example of the half-finished product (101) will be shown in FIG. 11. The half-finished product (101) shown in FIG. 11 is a two-way branch pipe. The first worker (151) carries the completed half-finished product (101) to the gastight testing area (40).

The second worker (152) performs a gastight testing step. In this gastight testing step, the second worker (152) tests the gas-tightness of the half-finished product (101) that has been produced in the brazing step.

Specifically, the second worker (152) firstly opens the cover door (46) to dispose the half-finished product (101) in the testing space (47). Subsequently, the second worker (152) connects a sealing plug and a gas filling hose to the end of the half-finished product (101), and then, closes the cover door (46) to fill the half-finished product (101) with testing gas having a predetermined pressure. If the half-finished product (101) is completely filled with the testing gas, the second worker (152) opens the cover door (46) and moves a gas detector capable of detecting a fluorocarbon gas along the surface of the half-finished product (101) to check whether or not the testing gas is leaking from the half-finished product (101). After the test is finished, the second worker (152) discharges the testing gas from the half-finished product (101), and detaches the plug and hose from the half-finished product (101). The second worker (152) carries only the half-finished product (101) from which the testing gas has not leaked to the finishing area (50).

Figure 12:
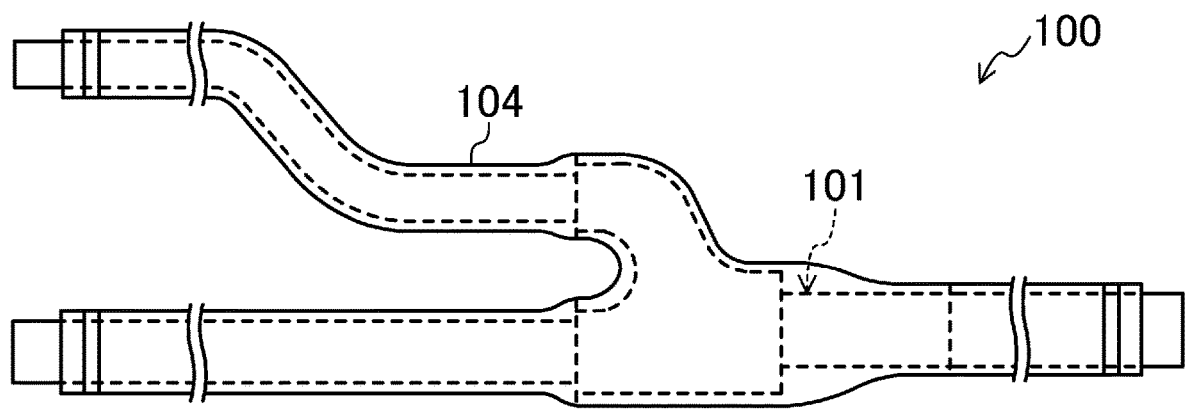
FIG. 12 is a plan view of an example of a half-finished product produced by the production device.

Next, the second worker (152) performs the finishing step. In this finishing step, the second worker (152) covers the half-finished product (101) that has passed the gastight test (in other words, the half-finished product (101) from which the testing gas has not leaked) with the thermal insulator (104). As a result, the pipe component (100) is completely produced as shown in FIG. 12. The pipe component (100) shown in FIG. 12 is the two-way branch pipe shown in FIG. 11 that is covered with the thermal insulator (104). In the finishing step, the second worker (152) attaches a protective cap to the end of the half-finished product (101). The second worker (152) performs these jobs on the finishing table (51).

The second worker (152) feeds the finished pipe component (100) from the delivery port (60) toward the outside of the box body (20). The delivery port (60) is opened along the upper surface of the finishing table (51). Therefore, the second worker (152), by only pushing the pipe component (100) put on the finishing table (51) toward a further side from the worker (152), can feed the pipe component (100) from the delivery port (60) toward the outside of the box body (20). The pipe component (100) fed from the delivery port (60) is received by the sheet member (62), and slides down on the body sheet (63).

As can be seen, in the production of the pipe component (100) performed in the production facility (10) of the embodiment, the half-finished product (101) that has been produced in the brazing area (30) disposed at the position closer to the rear end of the box body (20) is carried from the rear end of the box body (20) toward the front end thereof. Then, the half-finished product (101) is formed to be a complete product, i.e., the pipe component (100) in the finishing area (50) disposed at the position closer to the front end of the box body (20). The pipe component (100) that has been finished in the finishing area (50) is fed from the delivery port (60) toward the outside of the box body (20).

Advantages of First Embodiment

In the production facility (10) of the embodiment, in the interior space of the box body (20), the brazing area (30), the gastight testing area (40), and the finishing area (50) are aligned with one another in this order along the first side wall (21) of the box body (20). Thus, the working passage (55) is formed along the second side wall (22) of the box body (20). In the interior space of the box body (20), the workers (151, 152) producing the pipe component (100) can move among the plurality of areas (30, 40, 50) by passing through the straight working passage (55) along the second side wall (22) of the box body (20). This simplifies the lines of the operational flow of the workers (151, 152) in the interior space of the box body (20). Accordingly, the embodiment allows for disposing the brazing area (30), the gastight testing area (40), and the finishing area (50) in the interior space of one box body (20) without losing workability.

In the production facility (10) according to the embodiment, the brazing area (30) for brazing using fire is disposed at the position closer to the rear end of the box body (20). Therefore, the brazing area (30) can be ventilated sufficiently, reliably keeping the oxygen content in the brazing area (30) from decreasing too much.

Also, in the production facility (10) of the embodiment, the brazing area (30), the gastight testing area (40), and the finishing area (50) are aligned with one another in this order from the rear end of the box body (20) toward the front end thereof. In the production of the pipe component (100), the half-finished product (101) produced in the brazing area (30) can be tested or machined while being moved from the rear end of the box body (20) toward the front end thereof. According to the production facility (10) of the embodiment, the pipe component (100) can be produced as a flow operation by the plurality of workers (151, 152).

Also, in the production facility (10) of the embodiment, the delivery port (60) is formed in the first side wall (21) of the box body (20) at a position facing the finishing area (50). The pipe component (100) that has been finished in the finishing area (50) is carried from the delivery port (60) to the outside of the box body (20). The pipe component (100) that has been finished in the finishing area (50) that is furthest from the rear-end opening (23) of the box body (20) can directly be carried from the delivery port (60) toward the outside of the box body (20) without carrying the product from the front end of the box body (20) to the rear end thereof. Thus, the embodiment allows for further simplifying the line of the operational flow of the workers in the interior space of the box body (20), improving operational efficiency of the production operation of the pipe component (100).

In the production facility (10) of the embodiment, the delivery port (60) is formed along the upper surface of the finishing table (51). Therefore, the worker, by only pushing the pipe component (100) on the finishing table (51) toward a further side from the worker, can feed the pipe component (100) from the delivery port (60) toward the outside of the box body (20). Accordingly, the embodiment allows for easily carrying the pipe component (100) out.

In the production facility (10) of the embodiment, the pipe component (100) fed from the delivery port (60) is received by the sheet member (62). Therefore, this can prevent the pipe component (100) fed from the delivery port (60) from being broken.

In the production facility (10) of the embodiment, the pipe bender (71) is disposed adjacent to the brazing area (30) in the width direction of the box body (20). This can minimize the moving distance of the first worker (151) alternately performing the preparation step using the pipe bender (71) and the brazing step.

As described above, after the gastight test is finished, the second worker (152) detached the plug and hose from the target half-finished product (101). After the plug and hose is detached form the half-finished product (101), the testing gas left in the half-finished product (101) is discharged into the testing space (47). When the fluorocarbon gas included in the testing gas discharged from the half-finished product (101) remains in the testing space (47), the gastight test of a next half-finished product (101) cannot be performed.

In contrast, in the production facility (10) of the embodiment, the air supply fan (49) always supplies the testing space (47) with outside air. Therefore, the testing gas that has been discharged from the half-finished product (101) to the testing space (47) is pushed out by the outdoor air supplied by the air supply fan (49) and is quickly discharged from the testing space (47). That is to say, the production facility (10) of the embodiment can keep the testing space (47) for performing the gastight test with no fluorocarbon gas.

Therefore, if the testing gas for the gastight test leaks from the target half-finished product (101), the fluorocarbon gas included in the leaked testing gas can reliably be detected to reliably detect the half-finished product (101) that is not gastight (i.e., a defective product). Also, immediately after the gastight test of the half-finished product (101) is finished, a gastight test of a next half-finished product (101) can be started. Thus, a time taking for performing the gastight test of one half-finished product (101) can be reduced.

Variation of First Embodiment

In the production facility (10) of the embodiment, the box body (20) is separately formed from the undercarriage (202) of the trailer (201). Alternatively, this box body (20) may be integrally formed with the undercarriage (202) of the trailer (201).

The box body (20) forming the production facility (10) of the embodiment may be mounted onto the undercarriage (202) of a self-propelled truck. That is to say, a vehicle in which the box body (20) forming the production facility (10) of the embodiment is mounted may be a self-propelled vehicle (for example, a truck) or a non-self-propelled vehicle (for example, a trailer).

Second Embodiment

A second embodiment will be described. Here, it will be described how the production facility (10) in this embodiment is different from that in the first embodiment will now be described.

—Configuration of Box Body—

Figure 13:
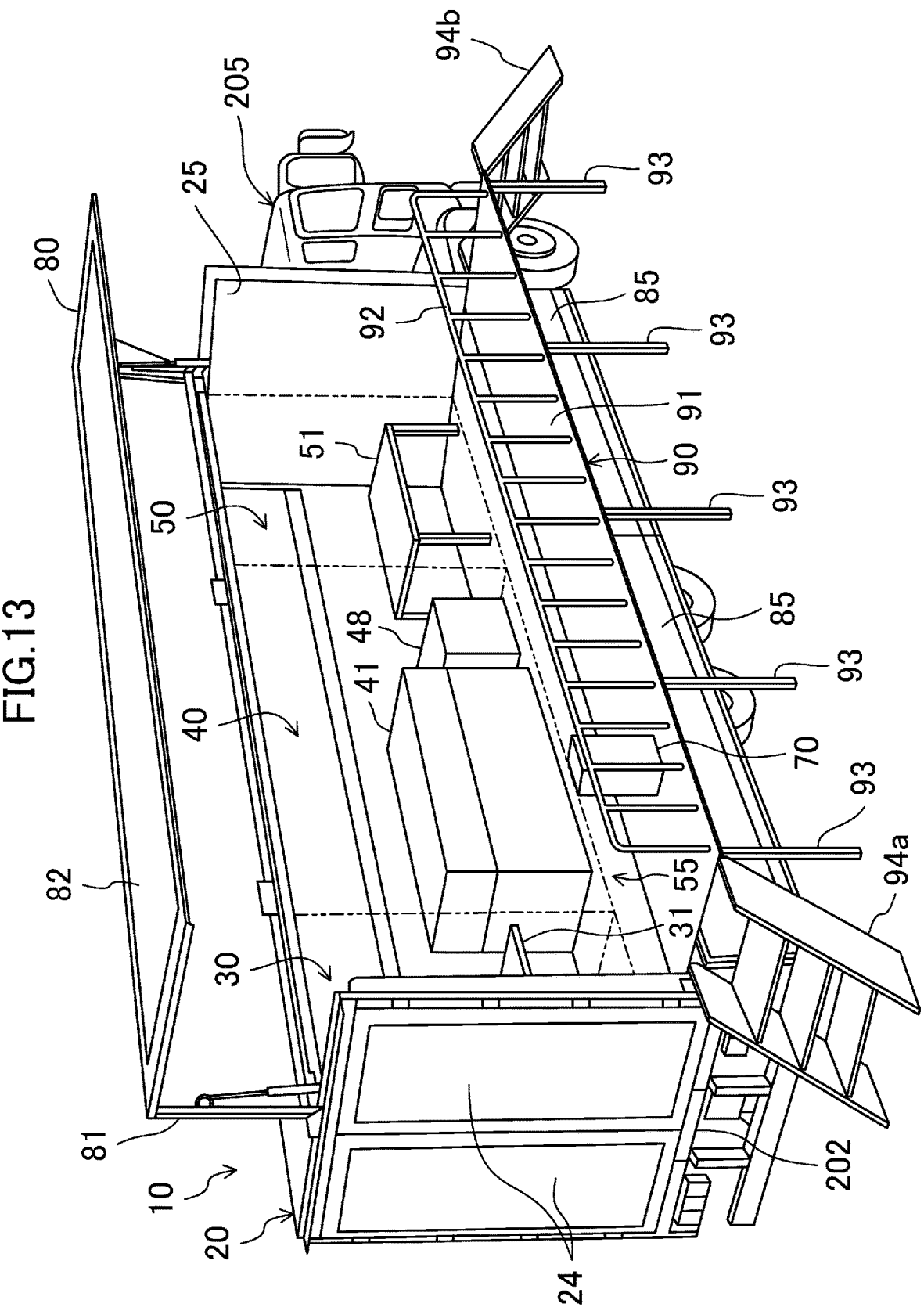
FIG. 13 is a perspective view of a production facility of a second embodiment in operation.

As shown in FIG. 13, in the production facility (10) of the present embodiment, the box body (20) is provided to the undercarriage (202) of a van type truck (205). The box body (20) of this embodiment is integrally formed with the undercarriage (202) of the truck (205).

Figure 14:
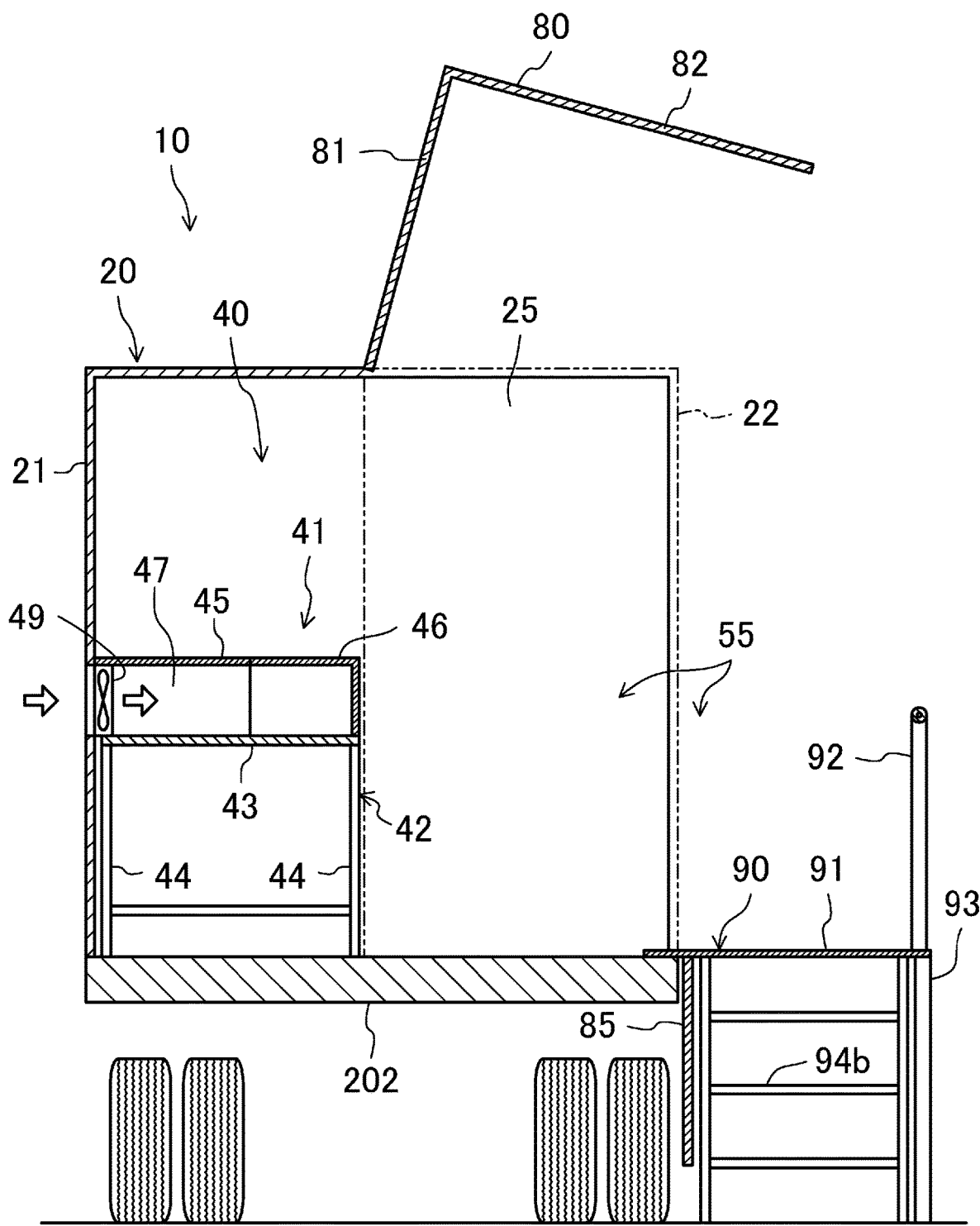
FIG. 14 is a cross-sectional view of the production facility of the second embodiment in operation and corresponds to FIG. 6.
Figure 15:
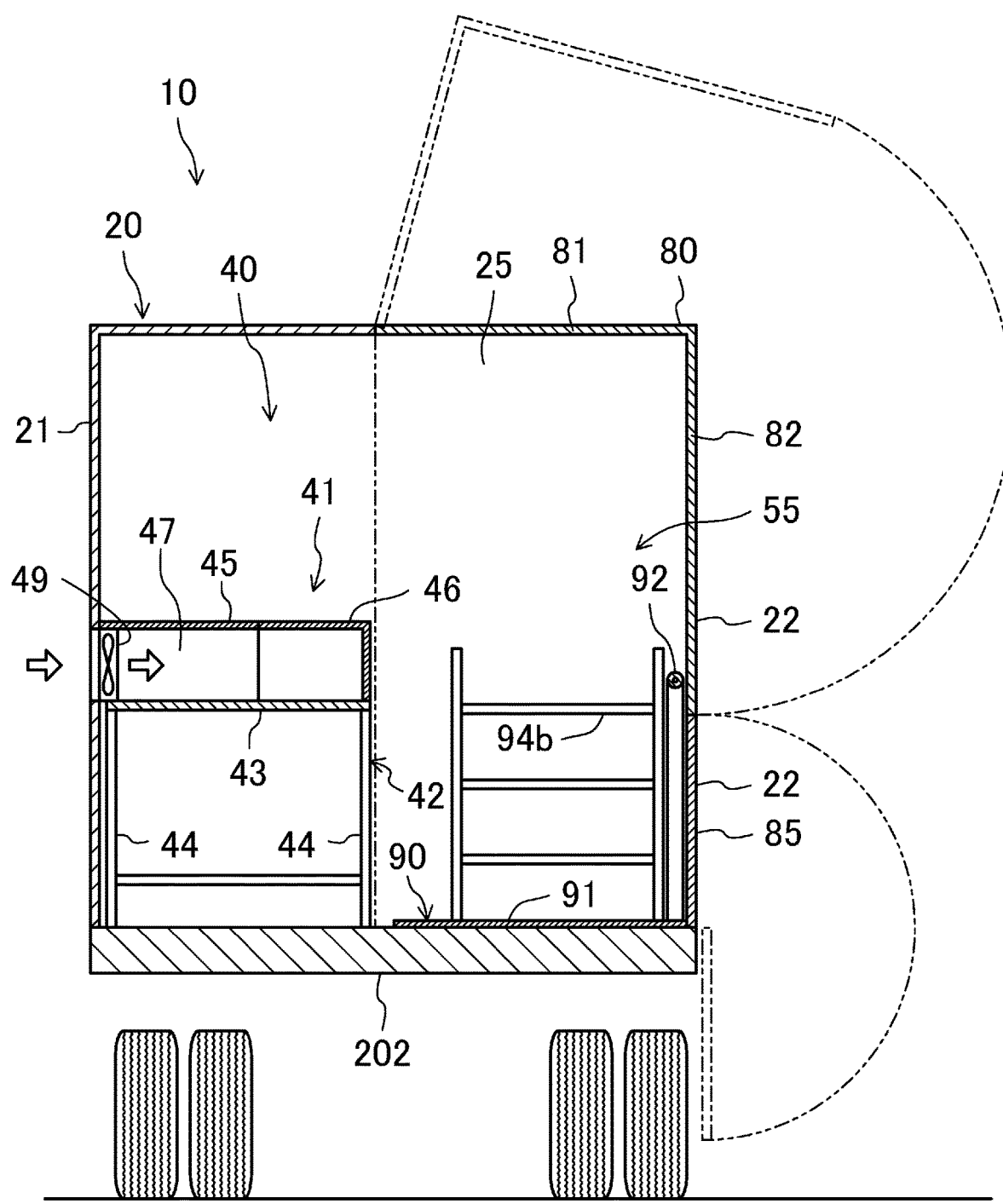
FIG. 15 is a cross-sectional view of the production facility of the second embodiment in non-operation and corresponds to FIG. 6.

As shown in FIGS. 14 and 15, the box body (20) includes a movable upper panel (80) and a movable lower panel (85).

The upper panel (80) and the lower panel (85) are elongated members disposed in a substantially all longitudinal part of the box body (20).

The upper panel (80) is in the shape of an L-shaped bent plate. This upper panel (80) includes a top plate portion (81) and a side plate portion (82). As shown in FIG. 15, the top plate portion (81) is in the shape of a rectangular plate that is substantially horizontally disposed. This top plate portion (81) forms a substantially half of the top panel of the box body (20) closer to the second side wall (22) (the right side in FIG. 15). As shown in FIG. 15, the side plate portion (82) is in the shape of a rectangular plate extending downward from one long side of the top plate portion (81). This side plate portion (82) forms the upper portion of the second side wall (22) of the box body (20). The upper panel (80) is turnable on a long side of the top plate portion (81) away from the side plate portion (82).

The lower plate (85) is in the shape of a rectangular plate. As shown in FIG. 15, the lower panel (85) is disposed so as to extend upward from a side edge of the bottom of the box body (20). The lower panel (85) forms the lower part of the second side wall (22) of the box body (20). The lower panel (85) is turnable on the lower long side.

As described above, in the box body (20) of the embodiment, the upper panel (80) and the lower panel (85) are turnable. In the box body (20) of the embodiment, the second side wall (22) is comprised of the side plate portion (82) of the upper panel (80) and the lower panel (85). The upper panel (80) and the lower panel (85) turn to be able to open/close the box body (20) of the embodiment.

Just like the first embodiment, in the interior space of the box body (20), the brazing area (30), the gastight testing area (40), and the finishing area (50) are aligned with one another in this order from the rear end toward the front end of the box body (20) along the first side wall (21) of the box body (20). In the production facility (10) of the embodiment, the air supply fan (32) of the brazing area (30) and the air supply fan (52) of the finishing area (50) are omitted. In the interior space of the box body (20), an area closer to the second side wall (22) is the working passage (55).

—Passage Extension Unit—

As shown in FIGS. 13 to 15, the box body (20) of the embodiment is provided with a passage extension unit (90). This passage extension unit (90) is a unit for forming, together with the interior space of the box body (20), the working passage (55). The passage extension unit (90) includes a passage plate (91) that is a passage formation member, a fence (92) for preventing downfall, a plurality of (five in this embodiment) support legs (93), first steps (94*a*) and second steps (94*b*).

The passage plate (91) is a member in the shape of a rectangular plate. The length of the long side of the passage plate (91) is substantially equal to that of the interior space of the box body (20) (longitudinal length). The passage plate (91) is disposed substantially in parallel with the floor surface of the box body (20). The passage plate (91) is attached to the bottom of the box body (20) via a guide rail (not shown) to be slidable on the box body (20). The passage plate (91) can move between a stored position where the whole of the passage plate (91) is stored inside the box body (20) (the position shown in FIG. 15) and a use position where most of the passage plate (91) protrudes outwardly from a side of the box body (20) (the position shown in FIG. 14).

The fence (92) is a member for preventing the worker from falling from the passage plate (91). The fence (92) is disposed so as to stand upright on the upper surface of the passage plate (91) along a long side of the passage plate (91) further from the box body (20). The fence (92) is disposed in a substantially entire long side of the passage plate (91). This fence (92) is detachably attached to the passage plate (91).

The support legs (93) are disposed between the ground and the passage plate (91) to support the passage plate (91). The support legs (93) are disposed so as to extend downward from the lower surface of the passage plate (91). The five support legs (93) of the embodiment are arranged at a substantially equal pitch along the long side of the passage plate (91) further from the box body (20). The support legs (93) can be attached to, or detached from, the passage plate (91).

The first steps (94*a*) are attached to a portion along a short side of the passage plate (91) closer to the rear end of the box body (20). The second steps (94*b*) are attached to a portion along a short side of the passage plate (91) closer to the front end of the box body (20). Each of the first steps (94*a*) and the second steps (94*b*) are tunably attached to the portion along the short side of the passage plate (91). Each of the first steps (94*a*) and the second steps (94*b*) may be detachably attached to the portion along the short side of the passage plate (91).

—Production Facility in Operation—

The state of the production facility (10) of the embodiment when the pipe component (100) is produced in the production facility (10) will be described.

As shown in FIGS. 13 and 14, in the production facility (10) in operation, the second side wall (22) of the box body (20) is opened. Specifically, the upper panel (80) rotates upward and is lifted up, and the lower panel (85) rotates downward and hangs down. The rear doors (24) disposed at the rear end of the box body (20) are closed not only when the production facility (10) is operated but also when the production facility (10) is not operated.

In the production facility (10) in operation, the passage extension unit (90) is extended. That is to say, the passage plate (91) is in the use position where the passage plate (91) protrudes outwardly from a side of the box body (20). The support legs (93) are attached to the passage plate (91), and lower ends of the first and second steps (94*a*) and (94*b*) are in contact with the ground. In this state, the passage plate (91), together with the area of the interior space of the box body (20) adjacent to the second side wall (22), forms the working passage (55). In this state, the bender unit (70) is disposed in the passage plate (91) at a position closer to the side of the brazing area (30) (see FIG. 13).

—Production Facility in Non-Operation—

The state of the production facility (10) of the embodiment when the pipe component (100) is not produced in the production facility (10) will be described. For example, the production facility (10) is paused while a worker's holiday or the truck (205) is moving.

As shown in FIG. 15, in the production facility (10) in non-operation, the passage extension unit (90) is stored. That is to say, the first and second steps (94*a*) and (94*b*) are put on the passage plate (91), and the support legs (93) are detached from the passage plate (91), allowing the passage plate (91) to be in the stored position. In this state, the whole of the passage extension unit (90) is stored in the interior space of the box body (20). Although not shown in FIG. 15, the support legs (93) detached from the passage plate (91) are retracted into the interior space of the box body (20).

In the production facility (10) in non-operation, the second side wall (22) of the box body (20) is closed. Specifically, the upper panel (80) rotates downward, and the lower panel (85) rotates upward. Thus, the lower edge of the side plate portion (82) of the upper panel (80) is brought in contact with the upper edge of the lower panel (85).

Advantages of Second Embodiment

This embodiment has advantages below, in addition to those in the above first embodiment.

In the box body (20) of the embodiment, the second side wall (22) can be opened/closed. When the second side wall (22) is opened, the half-finished product (101) or the body of the worker does not abut on the second side wall (22) during the operation in the box body (20). Therefore, according to the embodiment, the pipe component (100) can be produced smoothly in the box body (20), improving the production efficiency of the pipe component (100).

When the second side wall (22) of the box body (20) is opened (the state shown in FIGS. 13 and 14), the interior space of the box body (20) is sufficiently ventilated. This can omit the air supply fan (32) of the brazing area (30) and the air supply fan (52) of the finishing area (50) while keeping the oxygen content in the interior space of the box body (20) from decreasing too much.

In the embodiment, the passage plate (91) of the passage formation unit, together with a portion of the interior space of the box body (20) along the second side wall (22), forms the working passage (55). Therefore, according to the embodiment, the working passage (55) in which the worker moves and performs the operation can be expanded in the width direction of the box body (20) (a direction orthogonal to the longitudinal direction), further smoothly performing the production of the pipe component (100).

Variation of Second Embodiment

As described above, in the production facility (10) of the embodiment, the second side wall (22) of the box body (20) is opened, ensuring ventilation of the brazing area (30). Accordingly, in the production facility (10) of the embodiment, the brazing area (30), the gastight testing area (40), and the finishing area (50) may be aligned with one another in this order from the front end of the box body (20) toward the rear end thereof.

INDUSTRIAL APPLICABILITY

As can be seen from the foregoing, the present disclosure is useful for a production facility producing pipe components for use in installation of a refrigeration apparatus.

DESCRIPTION OF REFERENCE CHARACTERS

10 Production Facility
20 Box Body
21 First Side Wall
22 Second Side Wall
24 Rear Doors (Doors)
30 Brazing Area
31 Brazing Table
40 Airtight Testing Area
41 Airtight Testing Table
45 Cover Member
49 Air Supply Fan
50 Finishing Area
51 Finishing Table
60 Delivery Port
62 Sheet Member
71 Pipe Bender
91 Passage Plate (Passage Formation Member)
101 Half-finished Product
104 Thermal Insulator
201 Trailer (Vehicle)
202 Undercarriage
205 Van Type Truck (Vehicle)

The invention claimed is:

1. A production facility producing a pipe component for use in installation of a refrigeration apparatus, the production facility comprising:
   one box body disposed on an undercarriage of a vehicle to allow an interior space of the box body to serve as a working space;
   a brazing area formed in the interior space of the box body, and provided with at least a brazing table where a plurality of pipe elements are bonded together by brazing to produce a partially-finished product;
   a gastight testing area formed in the interior space of the box body and provided with at least a gastight testing table where gas-tightness of the partially-finished product is tested; and
   a finishing area formed in the interior space of the box body, and provided with at least a finishing table where the partially-finished product is covered with a thermal insulator to complete production of the pipe component, wherein
   in the box body, a rear-end opening is formed having doors that are openable/closeable, and
   the brazing area is disposed adjacent to the rear-end opening of the box body.

2. The production facility of claim 1, wherein
   the brazing area, the gastight testing area, and the finishing area are aligned with one another in this order from the rear end of the box body toward a front end of the box body.

3. The production facility of claim 2, wherein
   the box body includes a delivery port formed in a first side wall of the box body at a position along the finishing area, the delivery port configured for delivery of the pipe component out of the box body.

4. The production facility of claim 3, wherein
   the delivery port is a laterally elongated opening extending along an upper surface of the finishing table.

5. The production facility of claim 3, further comprising a sheet member stretching from the delivery port away from an exterior of the box body, the sheet member configured to receiving the pipe component fed from the delivery port.

6. The production facility of claim 1, further comprising a pipe bender disposed adjacent to the brazing area in a width direction of the box body, the pipe bender configured for bending a pipe constituting the partially-finished product.

7. The production facility of claim 1, wherein
   the gastight testing table includes:
   a cover member structured to house the partially-finished product by covering a testing space for the partially-finished product that is a target for the gastight test; and
   an air supply fan configured and disposed to supply the testing space with air from outside the box body.

8. The production facility of claim 1, wherein
   the box body includes an openable/closable second side wall and a first side wall that faces the second side wall when the second side wall is in a closed position.

9. The production facility of claim 8, wherein
the box body includes a plate-shaped passage formation member extending in the longitudinal direction of the box body, and the passage formation member configured to extend outwardly from a side of a bottom of the box body with the second side wall being opened, the passage formation member forming a passing where a worker moves.

* * * * *